US009659415B2

(12) United States Patent
Lee

(10) Patent No.: US 9,659,415 B2
(45) Date of Patent: May 23, 2017

(54) APPARATUS FOR WARNING OF OCCURRENCE OF ERROR OF DEVICE

(71) Applicant: VOLVO CONSTRUCTION EQUIPMENT AB, Eskilstuna (SE)

(72) Inventor: Chan-Ho Lee, Gyeongsangnam-do (KR)

(73) Assignee: VOLVO CONSTRUCTION EQUIPMENT AB (SE)

(*) Notice: Subject to any disclaimer, the term of this patent is extended or adjusted under 35 U.S.C. 154(b) by 0 days.

(21) Appl. No.: 15/109,329

(22) PCT Filed: Dec. 30, 2013

(86) PCT No.: PCT/KR2013/012385

§ 371 (c)(1),
(2) Date: Jun. 30, 2016

(87) PCT Pub. No.: WO2015/102121

PCT Pub. Date: Jul. 9, 2015

(65) Prior Publication Data

US 2016/0328888 A1 Nov. 10, 2016

(51) Int. Cl.
*B60Q 1/00* (2006.01)
*G07C 5/00* (2006.01)
(Continued)

(52) U.S. Cl.
CPC .............. *G07C 5/006* (2013.01); *B60K 35/00* (2013.01); *B60Q 9/00* (2013.01); *B60W 50/04* (2013.01);
(Continued)

(58) Field of Classification Search
CPC .......... G07C 5/006; B60K 35/00; B60Q 9/00; B60W 50/04; B60W 50/14; H04L 1/0025
(Continued)

(56) References Cited

U.S. PATENT DOCUMENTS 6,131,051 A * 10/2000 Beckert .................. G05B 15/02 250/366
2005/0055474 A1* 3/2005 Yang ..................... G06F 11/326 710/15
2010/0209787 A1 8/2010 Kajiwara et al.

FOREIGN PATENT DOCUMENTS

CN 201745445 U 2/2011
KR 20060084639 A 7/2006
KR 20090063430 A 6/2009

OTHER PUBLICATIONS

International Search Report for Application No. PCT/KR2013/012385 dated Sep. 29, 2014.

* cited by examiner

*Primary Examiner* — Kerri McNally
(74) *Attorney, Agent, or Firm* — Lerner, David, Littenberg, Krumholz & Mentlik, LLP

(57) ABSTRACT

Proposed is a warning system which includes: a warning device; a display device; an IC CPU for controlling the operation of the display device and the warning device; and a master ECU for, connected to the IC CPU through a communication channel and connected to one or more warning devices through a hardware channel, controlling the operation of the warning device through the IC CPU. The master ECU includes an error detection module to monitor regularly the data validity of the communication channel, the warning device and the response of the IC CPU, and an on/off module to operate the warning device. When the error detection module detects an error in the data validity of the communication channel, the warning device and the response of the IC CPU, the master ECU controls the on/off module to operate directly the warning device using the hardware channel.

6 Claims, 3 Drawing Sheets

10 40 26 24 28 22 30 20

(51) Int. Cl.

| | |
|---|---|
| ***B60W 50/04*** | (2006.01) |
| ***B60W 50/14*** | (2012.01) |
| ***B60K 35/00*** | (2006.01) |
| ***B60Q 9/00*** | (2006.01) |
| ***H04L 1/00*** | (2006.01) |
| *B60W 50/00* | (2006.01) |
| *B60W 50/029* | (2012.01) |

(52) U.S. Cl.
CPC ........... *B60W 50/14* (2013.01); *H04L 1/0025* (2013.01); *B60K 2350/106* (2013.01); *B60W 2050/0006* (2013.01); *B60W 2050/0292* (2013.01); *B60W 2050/143* (2013.01); *B60W 2050/146* (2013.01)

(58) Field of Classification Search
USPC .......................................................... 340/438
See application file for complete search history.

APPARATUS FOR WARNING OF OCCURRENCE OF ERROR OF DEVICE

CROSS-REFERENCE TO RELATED APPLICATION

This application is a national phase entry under 35 U.S.C. §371 of International Application No. PCT/KR2013/012385, filed Dec. 30, 2013, published in Korean, the disclosure of which is incorporated herein by reference.

TECHNICAL FIELD

The present disclosure relates to a system for warning a user that equipment is abnormal.

BACKGROUND ART

In conventional technologies, present is a warning system designed to prevent accidents by detecting voltages and currents supplied to a variety of devices provided in vehicles and warning that any one of the devices malfunctions. In this regard, a warning system may be required to include: a sensing means for detecting currents and voltages applied to a variety of electronic devices provided in a vehicle; a control means for controlling the overall operation to determine the statuses of the variety of electronic devices provided in the vehicle by analyzing signals from the sensing means; a warning means for displaying the statuses of the vehicle based on signals from the control means and generating warning signals; and an extension means configured to be controlled in response to signals from the control means, the extension means allowing a variety of devices to be added to the warning system on a user's request. The major object of the warning system is to reliably supply currents and voltages to the electronic devices of the vehicle and prevent erroneous operations due to malfunctions, thereby preventing a variety of accidents that would otherwise be caused by erroneous operations, by using these means.

However, in this warning system, and the control means for instructing the sensing means for detecting currents and voltages and the warning apparatus are connected with the warning apparatus by way of software. When communications are inactive due to a communication channel malfunctioning or being abnormal, it is difficult to recognize the malfunction and the status of the vehicle.

That is, in a system in which a warning apparatus receives drawing data from a master electronic control unit (ECU) using communication protocol and then displays images, when a communication channel or software of the warning apparatus fails, neither a warning nor an error message may be delivered to a user. Such a situation may have serious effects on the safety of the user and the management of the equipment.

DISCLOSURE

Technical Problem

There is required a technology allowing the master ECU to directly control the warning device without through the communication channel when there are errors in an instrument cluster (IC), software, or the communication channel between the master ECU and a warning apparatus.

Technical Solution

The present disclosure has been made keeping the above problems which may occur in the prior art in consideration, and the present disclosure proposes a separate hardware (H/W) channel to be added such that a master ECU can directly control a warning device within an IC. When an abnormality detection module detects an abnormality in communications between the IC and the master ECU, the master ECU sends a warning signal directly to the warning device through the separate hardware channel to directly operate the warning device of the IC.

Advantageous Effects

According to the present disclosure, although the master ECU controls the IC through the communication channel, and thus, when the communication channel or the IC malfunctions, information regarding the equipment is not provided to the user in a conventional way, a warning message can be sent to a user through the separate hardware channel connected to the warning device. It is thereby possible to improve the safety of the user and the reliability of the equipment.

BEST MODE

Figure 1:
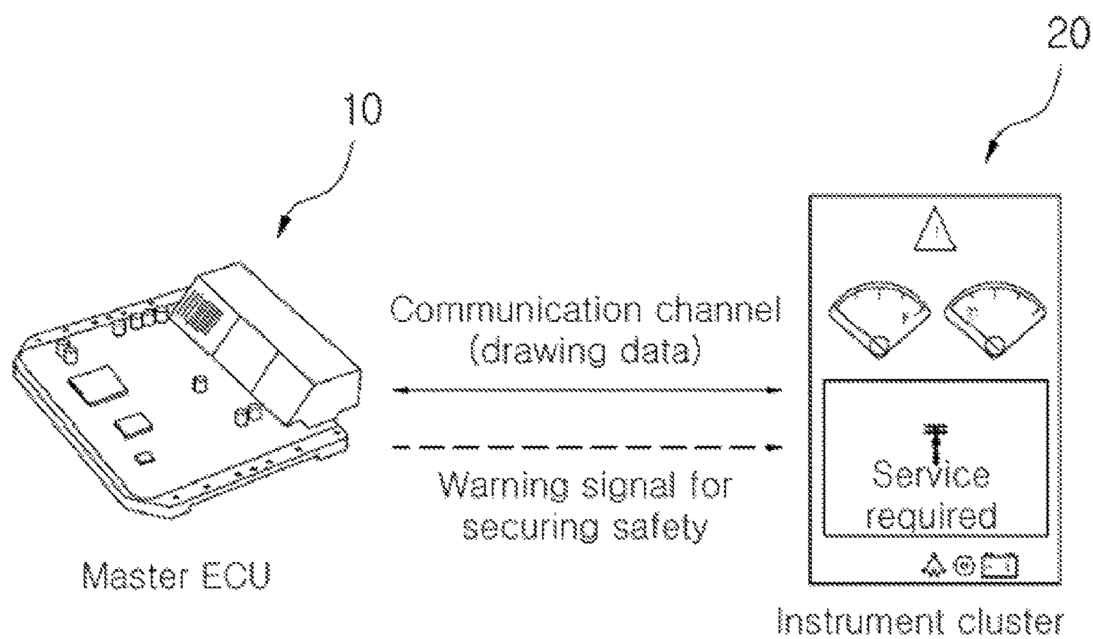
FIG. 1 illustrates a warning system of the prior art.

The present disclosure proposes a warning system including a warning device, a display device, an instrument cluster central processing unit (IC CPU) controlling the warning device and the display device, and a master electronic control unit (ECU), wherein the master ECU can directly control the warning device using a separate hardware channel even when communications between the master ECU and the IC CPU malfunction.

Hereinafter, reference will be made to the present disclosure in conjunction with the accompanying drawings.

The following embodiments are provided by way of specific examples so that a person having ordinary skill in the art to which the present disclosure relates could easily put the present disclosure into practice, and should not be construed as limiting the scope of the present disclosure.

Descriptions of specific parts unrelated to the present disclosure will be omitted. Throughout this document, the same reference numerals and symbols will be used to designate the same or like components.

Throughout the entirety of the specification and the appended Claims, the terms "comprise," "include," "have," and any variations thereof used herein are intended to cover a non-exclusive inclusion unless explicitly described to the contrary.

FIG. 1 illustrates a warning system of the prior art.

In the prior art, it has been typical that a master ECU and an instrument cluster send and receive drawing data therebetween through a communication channel, and that the master ECU transmits a warning signal to the instrument cluster to give a safety-related warning. However, in this system, when the communication channel malfunctions, the master ECU can neither notice an abnormality in the instrument cluster nor cope with the abnormality, which is problematic.

Figure 2:
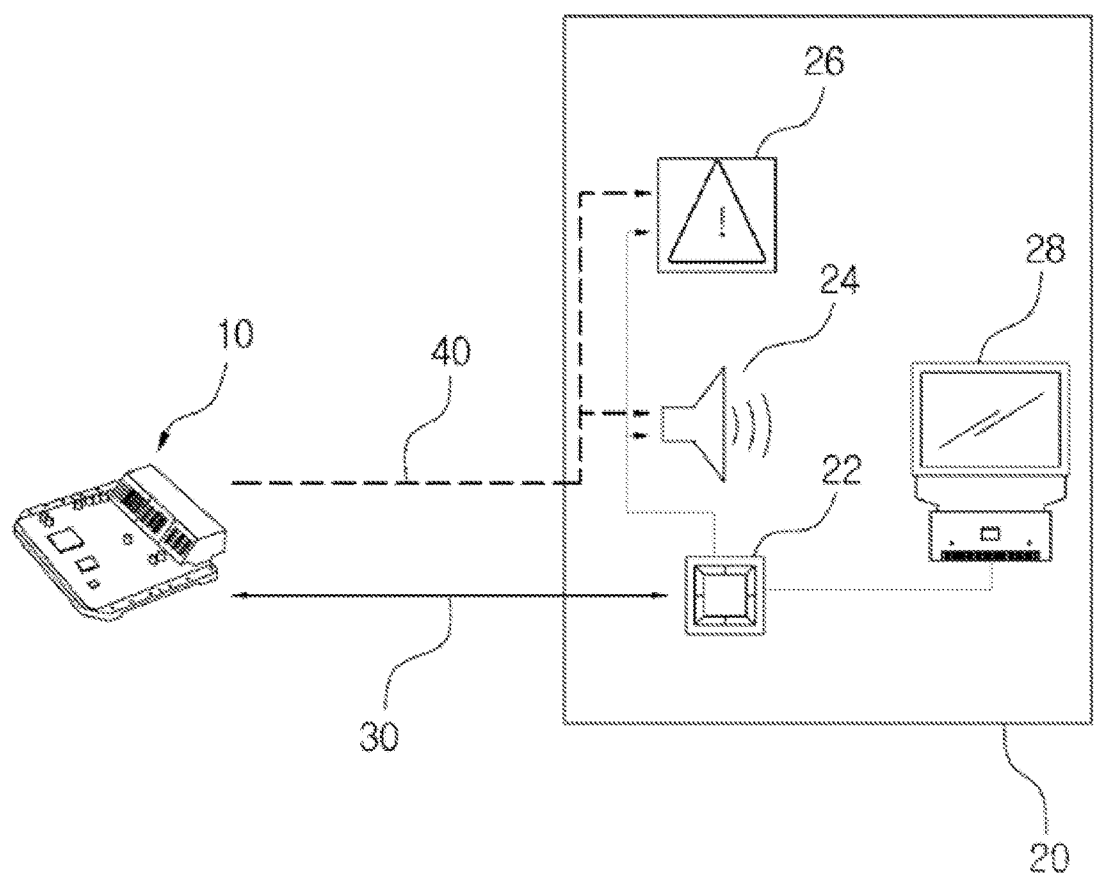
FIG. 2 illustrates a warning system according to an exemplary embodiment.

FIG. 2 illustrates a warning system according to an exemplary embodiment.

An instrument cluster (hereinafter, will be referred to as an IC) 20 includes a warning device notifying a user that the equipment is abnormal or is in a danger, a display device 28 providing information regarding operating conditions and error messages to the user, and an IC CPU 22 controlling the warning device and the display device. The warning device may include a warning light generator 26, a warning sound generator 24, a vibrator, and so on. Accordingly, the IC 20 is an assembly of devices, including the warning device, the display device, and the IC CPU.

The master ECU 10 and the IC 20 control the display device 28 and the warning device using a communication channel allowing for two-way communications. The communication channel is a channel typically allowing two-way communications. The master ECU transmits drawing data and control commands to the IC CPU through the communication channel 30. In response to received drawing data and control commands, the IC CPU may control the display device, the warning light generator, the warning sound generator, the vibrator, and so on.

The master ECU is connected to the IC CPU through the communication channel and is connected to at least one of the warning light generator, the warning sound generator, and the vibrator through a hardware channel. The master ECU may control the operation of the warning device through the IC CPU.

The master ECU may include an abnormality detection module periodically monitoring the validity of data through the communication channel and the responses of the warning device and the IC CPU and an on/off module operating the warning device.

Afterwards, when the abnormality detection module detects an abnormality in the validity of data through the communication channel or in the response of the warning device or the IC CPU, the master ECU can control the on/off module to directly operate the warning device through the hardware channel 40.

Through this process, the master ECU can control the warning device of the IC even when the master ECU cannot control the IC through the communication channel due to an abnormality in the communication channel between the master ECU and the IC CPU.

MODE FOR INVENTION

In the warning system according to the present disclosure, the abnormality detection module can monitor the validity of data through the communication channel, the response of the warning device, and the response of the IC CPU using a specific method. This is intended to continuously check whether or not the warning device, the IC CPU, and the communication channel operate properly.

Specifically, the abnormality detection module can monitor the validity of data through the communication channel and the responses of the warning device and the IC CPU using at least one method selected from among checksum, cyclic redundancy check (CRC), parity bit, and message acknowledgement methods.

In addition, data can be transmitted and received between the master ECU and the IC CPU through the communication channel using a variety of methods.

Specifically, data can be transmitted and received through the communication channel using at least one method selected from among CAN, SPI, LIN, RS232, RS422, and RS485.

Figure 3:
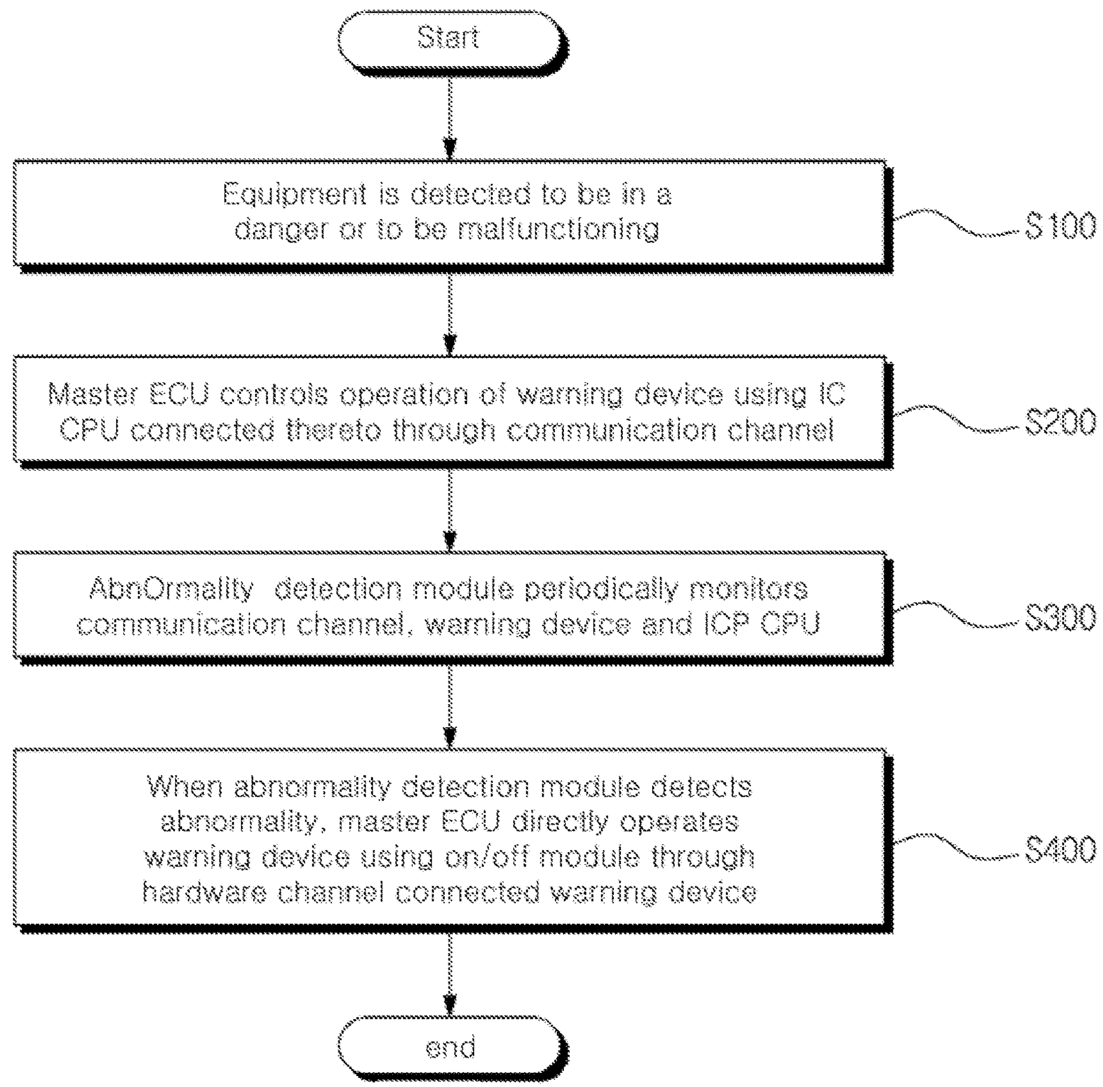
FIG. 3 illustrates a warning method according to an exemplary embodiment.

The present disclosure also proposes a warning method corresponding to the warning system. FIG. 3 illustrates a warning method according to an exemplary embodiment.

The warning method of notifying a user of an abnormality of the equipment when at least one of the warning device, the IC CPU, and the communication channel is abnormal may include the following steps.

1. When the equipment is detected to be in a danger or to be malfunctioning (S100), the master ECU controls the operation of the display device and the operation of the warning device including at least one of the warning sound generator, the warning light generator, and the vibrator using the IC CPU connected thereto through the communication channel (S200).

2. The master ECU periodically monitors the validity of data through the communication channel and the responses of the warning device and the IC CPU using the abnormality detection module (S300).

3. When the abnormality detection module detects an abnormality in the validity of data through the communication channel or in the response of the warning device or the IC CPU, the master ECU directly operates the warning device using the on/off module through the hardware channel connected to the warning device (S400).

In the warning method, as in the warning system, the abnormality detection module can monitor the validity of data through the communication channel and the responses of the warning device and the IC CPU using at least one method selected from among checksum, CRC, parity bit, and message acknowledgement methods.

In addition, in the warning method, data can be transmitted and received through the communication channel using at least one method selected from among CAN, SPI, LIN, RS232, RS422, and RS485.

The foregoing embodiments are merely illustrative of the certain principles of the present disclosure. It is obviously possible for a person having ordinary skill in the art to modify or alter the arrangements and details described hereinabove. It is intended therefore that the scope of the present disclosure be defined by the Claims appended hereto not by the specific descriptions presented in the foregoing embodiments.

The invention claimed is:

1. A warning system comprising:

a warning device comprising at least one of a warning sound generator, a warning light generator, and a vibrator;

a display device configured to notify a user of information regarding operating conditions and an error message;

an instrument cluster central processing unit configured to control operations of the display device and the warning device;

a master electronic control unit configured to be connected to the instrument cluster central processing unit through a communication channel and connected to at least one of the warning light generator, the warning sound generator, and the vibration through a hardware channel, the master electronic control unit controlling the operation of the warning device using the instrument cluster central processing unit, wherein the master electronic control unit comprises:

an abnormality detection module periodically monitoring validity of data through the communication channel and responses of the warning device and the instrument cluster central processing unit and an on/off module operating the warning device, and wherein, when the abnormality detection module detects an abnormality in the validity of data through the communication channel or in the response of the warning device or the instrument cluster central processing unit, the master electronic control unit controls the on/off module to directly operate the warning device through the hardware channel.

2. The warning system of claim 1, wherein the abnormality detection module monitors the validity of data through the communication channel and the responses of the warning device and the instrument cluster central processing unit using at least one method selected from among checksum, cyclic redundancy check, parity bit, and message acknowledgement methods.

3. The warning system of claim 1, wherein the data is able to be transmitted and received through the communication channel using at least one method selected from among CAN, SPI, LIN, RS232, RS422, and RS485.

4. A warning method comprising:

controlling step in which, when equipment is detected to be in a danger or to be malfunctioning, a master electronic control unit controls an operation of a display device and an operation of a warning device including at least one of a warning sound generator, a warning light generator, and a vibrator using an instrument cluster central processing unit connected thereto through a communication channel;

monitoring step in which the master electronic control unit monitors validity of data through the communication channel and responses of the warning device and the instrument cluster central processing unit using an abnormality detection module; and operating step in which, when the abnormality detection module detects an abnormality in the validity of data through the communication channel or in the response of the warning device or the instrument cluster central processing unit, the master electronic control unit directly operates the warning device using an on/off module through the hardware channel connected to the warning device.

5. The warning method of claim 4, wherein the abnormality detection module monitors the validity of data through the communication channel and the responses of the warning device and the instrument cluster central processing unit using at least one method selected from among checksum, cyclic redundancy check, parity bit, and message acknowledgement methods.

6. The warning method of claim 4, wherein the data is transmitted and received through the communication channel using at least one method selected from among CAN, SPI, LIN, RS232, RS422, and RS485.

* * * * *